Patented Oct. 13, 1925.

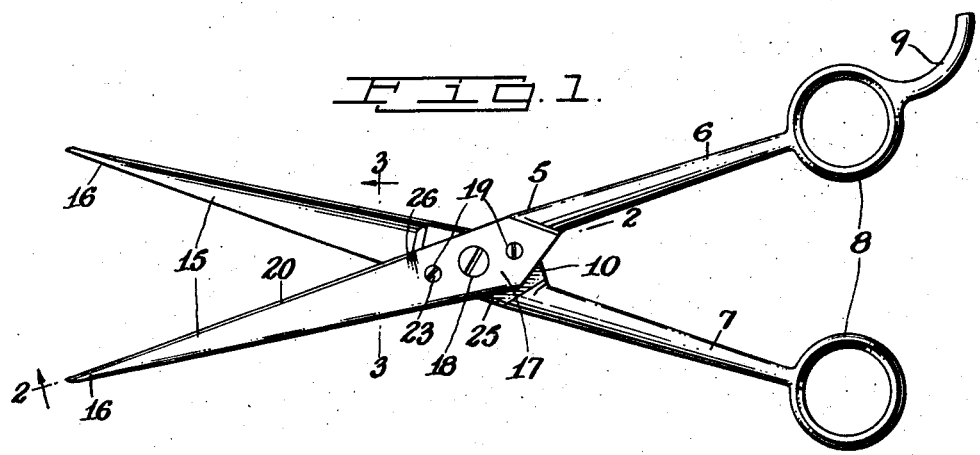
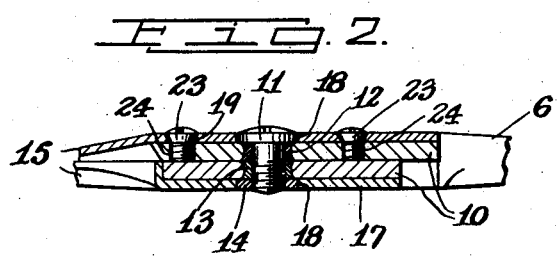
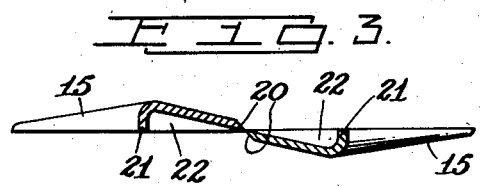
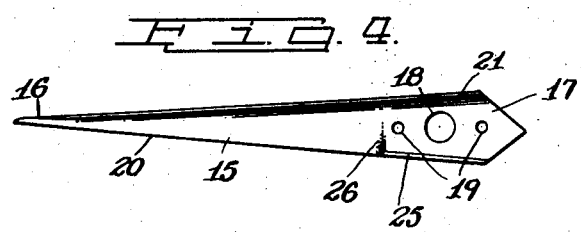

1,556,769

UNITED STATES PATENT OFFICE.

CHARLES DRIEST, JR., OF MARLBORO, NEW JERSEY.

SHEARS.

Application filed November 18, 1922. Serial No. 601,781.

*To all whom it may concern:*

Be it known that I, CHARLES DRIEST, Jr., a citizen of the United States, and residing at Marlboro, in the county of Monmouth and State of New Jersey, have invented certain new and useful Improvements in Shears, of which the following is a specification, such as will enable those skilled in the art to which it appertains to make and use the same.

This invention relates to shears of various kinds and classes such for example as dressmakers' shears, barbers' shears and the like, and the object of the invention is to provide a device of the class specified with handle members and blade members composed of separate and independent grades of material secured together, the blade members being composed of a high grade steel, while the handle members may be composed of any suitable material; a further object being to provide means for detachably securing the blade members to said handle members where said handle members are pivoted together, and whereby said blade members may be removed without removing the pivotal connection of said handle members; and with these and other objects in view the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of a pair of shears made according to my invention and with the handle members and blade members thereof in an open position;

Fig. 2 a partial section on the line 2—2 of Fig. 1 on an enlarged scale;

Fig. 3 a transverse section on the line 3—3 of Fig. 1 on an enlarged scale; and, Fig. 4 an inside view of one of the blade members which I employ.

In carrying my invention into effect, I provide a pair of shears 5, such as employed by barbers, and composed of two handle members 6 and 7 having loops or eyes 8 at their free ends to receive the fingers of a hand and one of said loops or eyes being provided with a hook-shaped extension 9, the other end portions of the handle members 6 and 7 are flattened and of less thickness than said handle members as shown at 10 and are pivoted together by a screw 11 which passes through a bushing 12 in the part 10 of the handle member 6 and is in threaded engagement with a similar bushing 13 in the part 10 of the handle member 7 and a lock washer 14 is employed to prevent the accidental displacement of the screw 11.

The bushings 12 and 13 are permanently secured in the parts 10 of the handle members 6 and 7 and serve to take up the wear between said parts 10 in the manipulation of the shears as will be understood.

I also employ two blade members 15 which are secured to the parts 10 of the handle members 6 and 7, and both of which are of the same construction, and in the construction shown the blade members 15 are composed of sheet metal fashioned to form pointed ends 16, and said blade members taper gradually to the head ends 17 thereof, and the head ends of said blade members are provided with comparatively large apertures 18, at the opposite sides of which are smaller apertures 19. The inner edges of said blade members are beveled as shown at 20 to form cutting edges which extend from the pointed ends 16 thereof substantially to the pivot ends of said blade members as shown in Fig. 1 of the drawing, and the outer side edges of said blade members are bent to form inwardly directed flanges 21 which reinforce said blade members and provide on the inner faces of said blade members pockets 22, and by reason of this construction the cutting edges of said blade members are free to slide one upon the other in the manipulation of the shears to provide perfect cutting operations.

It will be understood that the blade members 15 are mounted in connection with the parts 10 of the handle members 6 and 7 by placing said blade members on the outer faces of the parts 10 with the head of the screw 11 and the lock washer 14 in the apertures 18 of said blade members and screws 23 are passed through the apertures 19 of the blade members 15 and into similar threaded apertures 24 in the parts 10 of the handle members 6 and 7.

The inner ends of the blade members 15 are provided with comparatively short flanges 25 along the inner or cutting edge thereof, which flanges are adapted to overlap the parts 10 to form perfect interlocking of the blade members 15 with the parts 10 and to relieve the strain on the screws 23. In other words the parts 10 of the handle members 6 and 7 fit snugly within the flanges 25 and that part of the flanges 21 which cooperates with said parts 10.

It will be noted that the blade members 15 are pressed inwardly toward each other at the cutting edges thereof as shown at 26 to bring the cutting edges in contact with each other from the parts 10 of the handle members to the pointed ends 16 thereof.

From the foregoing it will be apparent that the blade members 15 may be removed from the handle members 6 and 7, or the parts 10 thereof, without removing the pivotal connection of said handle members, or without dissecting said handle members and in this way it will also be understood that whenever desired new blade members may be substituted for old ones and the handle members may be continually used as the holders for the blade members, and any type of blade members or handle members may be employed, the distinctive features of the invention being to provide a tool of the class described with blade members composed of one material, preferably a high carbon steel, with handle members composed of other material which may be a cheaper material or a more expensive material, if gold, silver or other handle members are desired, and another feature of the invention resides in the detachable mounting of the blade members in connection with the handle members, and it will be understood that while I have shown and described certain details of construction for carrying my invention into effect, that I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. A pair of shears of the class described comprising pivotally connected handle members which when coupled together form a unitary structure, the coupling of said handle members being formed by bushings mounted in said handle members, a screw passed through said bushings and provided with a nut for retaining said handle members against displacement, and blade members detachably mounted in connection with said unitary structure and provided with apertures adapted to receive and pass freely over the heads of the screw and nut mounted thereon.

2. A tool of the class described comprising pivoted handle members, the pivoted end portions of which are reduced to form recesses on the outer faces thereof, blade members formed independent of said handle members and the inner ends of which are fashioned to conform with and enter the recesses of the handle members, and means whereby the blade members may be removably attached to said handle members when pivoted together.

3. A tool of the class described comprising pivoted handle members, the pivoted end portions of which are reduced to form recesses on the outer faces thereof, blade members formed independent of said handle members and the inner ends of which are fashioned to conform with and enter the recesses of the handle members, means whereby the blade members may be removably attached to said handle members when pivoted together, and said blade members being apertured to receive the means for pivotally connecting the handle members.

4. A tool of the class described comprising pivoted handle members, the pivoted end portions of said handle members being reduced on the opposite outer faces thereof to form recesses of angular formation, blade members the inner ends of which are fashioned to conform with the recessed ends of the handle members and to fit snugly therein and to lie flush with the handle members, said blade members being formed independent of the handle members and being fashioned to pass freely over the pivotal connection of the handle members, and means for detachably connecting the blade members with the handle members when said handle members are pivoted together.

5. In a pair of shears of the class described, two handle members provided at one end with finger pieces and at the other end with apertures adapted to receive bushings, means passed through the bushings mounted in the apertures of said handle members for pivotally connecting said handle members, and means for preventing the rotation of said bushings.

In testimony that I claim the foregoing as my invention I have signed my name this 17th day of Nov., 1922.

CHARLES DRIEST, Jr.